United States Patent [19]

Seeburger et al.

[11] 4,296,220

[45] Oct. 20, 1981

[54] METHOD FOR PREPARING VINYL ESTER RESINS

[75] Inventors: Harold O. Seeburger; Ralph G. Beattie; Violete L. Stevens, all of Midland, Mich.

[73] Assignee: The Dow Chemical Company, Midland, Mich.

[21] Appl. No.: 155,882

[22] Filed: Jun. 2, 1980

[51] Int. Cl.$^3$ .................. C08G 8/32; C07C 57/00; C07C 69/54
[52] U.S. Cl. .................. 525/507; 560/209; 560/221; 526/320
[58] Field of Search .................. 525/507; 528/112; 560/209, 221

[56] References Cited

U.S. PATENT DOCUMENTS

| | | | |
|---|---|---|---|
| 3,066,112 | 11/1962 | Bowen | 260/41 |
| 3,676,524 | 7/1972 | Takiyama et al. | 525/507 X |
| 3,840,606 | 10/1974 | Vanlerberghe | 260/615 B |
| 3,872,162 | 3/1975 | Radlove et al. | 560/209 |
| 3,959,390 | 5/1976 | Vanlerberghe | 260/615 R |
| 4,003,961 | 1/1977 | Stevens et al. | 260/874 |
| 4,092,339 | 3/1978 | Stevens et al. | 260/410.6 |
| 4,143,090 | 3/1979 | Vargiu et al. | 525/507 X |

*Primary Examiner*—Earl A. Nielsen

[57] ABSTRACT

A method for preparing vinyl ester resins comprises reacting mono-, di- or polyhydroxy functional phenols with a tertiary alkyl glycidyl ether in the presence of a catalyst, e.g., triphenyl phosphine, followed by dealkylating and esterifying the adduct with an olefinically unsaturated aliphatic acid, e.g., acrylic acid, in the presence of a strong acidic catalyst, e.g., p-toluene sulfonic acid.

11 Claims, No Drawings

METHOD FOR PREPARING VINYL ESTER RESINS

BACKGROUND OF THE INVENTION

A valuable class of curable resins is prepared by reacting an unsaturated monocarboxylic acid with a polyepoxide. Such resins, called vinyl ester resins, can be cured by free radical catalysts or by radiation inducement. When made by the direct esterification of epoxide with acid, there are at least two competing reactions, vis. esterification and epoxy condensation. The latter leads to higher molecular weight vinyl ester resin fractions which increase the viscosity of the product significantly. To meet the rheological requirements of most fabrication methods a high viscosity resin requires increased dilution with reactive diluents. Other problems are also created by the high viscosity. It would be desirable to have a procedure whereby vinyl ester resins of more uniform molecular weight distribution could be prepared.

SUMMARY OF THE INVENTION

The present invention provides a novel procedure for preparing vinyl ester resins by the reaction of a phenolic hydroxyl compound and tertiary alkyl glycidyl ether followed by the concurrent or sequential dealkylation and esterification with a monoethylenically unsaturated monocarboxylic acid. The procedure results in a vinyl ester resin of lower viscosity than that of comparable structure made by the prior method of directly esterifying an epoxide with a carboxylic acid.

DETAILED DESCRIPTION OF THE INVENTION

The phenolic hydroxyl compound may be a mono-, di- or polyhydroxyl phenol such as phenol, halogenated phenols, alkyl substituted phenols, bisphenols, hydroquinones, novolacs and others. Mixtures of such phenols may be used as, for example, a phenol and its halogenated equivalent.

The tertiary alkyl glycidyl ether is one having a tertiary alkyl group wherein the corresponding alkene is volatile at the reaction temperature used in the dealkylation and esterification steps so that the alkene can be removed during those steps. As a practical matter, the tertiary butyl esters are of primary interest, though others, such as the tertiary amyl ethers may be used.

In the first step of the reaction, the ether and the phenolic hydroxyl compound are in the range of from stoichiometric up to a ten percent molar excess of ether per mole of phenolic hydroxyl. Less than stoichiometric amounts means an excess of the phenolic hydroxyl compound and results in difficult problems in isolating the desired product. Greater than a ten percent molar excess of the ether is unnecessary, provides no additional benefits and results in isolation and purification problems.

The preferred catalysts for the first reaction step are basic materials such as the alkali metals and their hydroxides, tertiary amines and trisubstituted phosphines. The alkali metals and their hydroxides and the tertiary amine catalysts can form higher molecular weight products in the presence of excess t-alkyl glycidyl ether, so near stoichiometric amounts of the ether is desired when using these catalysts. Triphenyl phosphine, however, and other trisubstituted phosphines, do not form such high molecular weight products and the reaction essentially stops after the addition of 1 mole ether/mole of phenolic-OH and for that reason is the preferred catalyst. Acid catalysts can cause dealkylation of the t-alkyl group of the epoxide and should be avoided in the first step of the reaction. The preferred catalyst concentration is 0.2 weight percent to 1.0 weight percent based on the final product weight. Less than 0.2 weight percent catalyst results in a more sluggish reaction and above 1.0 weight percent catalyst is usually unnecessary to get complete reaction under reasonable reaction conditions.

The use of a solvent is most helpful for a number of reasons. The solvent can dissolve the phenolic hydroxyl compound when the reaction temperature to be used is below the melting point of that compound. It can also be an azeotropic solvent for removing water present or formed and which could lead to undesirable glycol by-products if not removed. Also, any solvent would add bulk to the initial reaction charge to permit more efficient agitation and a recordable temperature at the start of the reaction. Dioxane is a typically useful solvent. Others will be known to those skilled in the art.

The temperature of the first reaction temperature may be chosen from a wide range although from 120° to 150° C. is preferred. Below 120° C. the reaction is slow and above 150° C. the reaction is harder to control and may result in a dark colored product.

The reaction pressure is preferably kept below 50 pounds per square inch gauge (446 kilopascals). Air and oxygen usually result in highly colored products in the presence of base catalysts. The reaction should be blanketed under nitrogen to avoid that problem.

The second step of the procedure involves the simultaneous or sequential dealkylation and esterification of the product of the first step.

The acids useful in the esterification are those ethylenically unsaturated monocarboxylic acids. Included as typical examples are acrylic, methacrylic, crotonic and cinnamic acids. Also included are those half esters of a dicarboxylic acid, such as maleic, phthalic and others, with a hydroxyalkyl acrylate or methacrylate. Vinyl ester resins made with the latter half esters are known in U.S. Pat. No. 3,367,992. Acrylic and methacrylic acids are advantageous species of acid with methacrylic acid being preferred. The alpha methyl substituent of methacrylic acid appears to shield the ester group making that group less susceptible to chemical attack, thereby increasing the chemical resistance of the esters.

The second step of the reaction is conducted in the presence of a strong acid catalyst. Suitable catalysts include boron trifluorides, phosphoric acid, sulfuric acid, alkanesulfonic acids, such as hexadecanesulfonic acid, and arylsulfonic acids, such as benzenesulfonic acid, toluenesulfonic acid and naphthalenesulfonic acid. The arylsulfonic acids are preferred.

Preferably, the catalyst concentration is 0.5 to 3.0 weight percent based on the weight of the phenolic hydroxyl compound/ether adduct.

When the reaction is conducted sequentially, the catalyst is introduced into the adduct and the dealkylation induced at an elevated temperature of at least about 80° C. maintained for 2 or 3 hours until most of the alkene, such as the isobutylene formed from tertiary-butyl, is removed by venting at atmospheric pressure. It is frequently desirable to drive the reaction to completion by continuing the reaction for one or more hours at subatmospheric pressure.

To prevent premature polymerization of the unsaturated acid during the esterification step, it is desirable to include a small amount of known free radical polymerization inhibitor into the reaction mix. Such inhibitors are known and include typically hydroquinone, the methyl ether of hydroquinone, phenothiazine and others.

When the reaction is conducted simultaneously, all of the ingredients, including an acid catalyst, are introduced into the reaction vessel. The reaction mix is heated at elevated temperature of about 80° C. at atmospheric pressure until substantial completion of the dealkylation and esterification. It is sometimes advantageous to begin the reaction at a lower temperature of about 80° to 95° C. and then after 20 minutes or so to raise the temperature to from about 95° to 100° C. and finally to drive the reaction to completion and to assure removal of the alkene to continue the reaction at such temperature at subatmospheric pressure.

The concept of the invention will be more apparent from the following examples which illustrate the best mode of carrying out the claimed procedures without the claims being limited thereto.

EXAMPLE 1

Preparation of a Bisphenol A/t-Butyl Glycidyl Ether (t-BGE) Adduct

To a clean and nitrogen purged two gallon autoclave, the following ingredients were charged: 1596 grams (7.0 moles) p,p'-isopropylidene diphenol (Bisphenol A), 1380 grams dioxane and 18 grams triphenyl phosphine. The contents were heated to 100° C. to dissolve the bisphenol A and 425 grams of dioxane were distilled off to dry the kettle contents. Then 2002 grams (15.4 moles) t-butyl glycidyl ether (a 10 percent molar excess based upon phenolic hydroxyls) was gradually added to the stirred autoclave maintained at 130°-140° C. and 10-45 pounds per square inch gauge (68.9 to 310.3 kilopascals). After the epoxide addition, the autoclave contents were post-heated an additional 3 hours to complete the reaction. The contents were maintained at 140° C. and the pressure reduced to 10 millimeters mercury to remove the volatiles yielding 1120 grams distillate.

The autoclave contents amounted to 3380 grams. Nuclear magnetic resonance (NMR) spectra indicated a pure product.

EXAMPLE 2

Dealkylation of the Bisphenol A/t-BGE Adduct

To a stirred three necked glass flask equipped with a flash head connected to a receiver having a reflux condenser, in turn, connected to a vacuum source were charged: 1464 grams (2.984 moles) bisphenol A-t-BGE adduct), 41 grams (0.215 mole) p-toluene sulfonic acid"-H$_2$O catalyst. The contents were heated at 90°-100° C. for 2.5 hours at atmospheric pressure to remove most of isobutylene which was vented off. The pressure was gradually reduced to 50 mm Hg over a 1 hour period at 100° C. The temperature was then gradually raised to 112° C. at 55 mm Hg over a 1.5 hour period to finish the dealkylation yielding 1181 grams dealkylated product or 97 percent.

EXAMPLE 3

Acrylation of Dealkylated Bisphenol A-t-BGE Adduct

To a stirred three necked glass flask equipped with a flash head connected to a receiver having a reflux condenser, in turn, connected to a vacuum source, were charged: 198.4 grams (0.5 mole) dealkylated bisphenol A-t-BGE adduct including 0.034 mole p-toluene sulfonic acid, 0.43 gram phenothiazine (polymerization inhibitor) and 232.0 grams (3.13 moles) 97 percent acrylic acid (213 mole percent excess). The contents were heated quickly to 100° C. and then held at 85°-100° C. at atmospheric pressure for 10 minutes and then held at 99° C. at a pressure of 150 mm Hg for 1.5 hours to complete esterification reaction. The reaction yielded 96.7 grams distillate containing 1.15 moles hydrogen ion as acrylic acid and 334 grams crude product containing 0.785 mole hydrogen ion as acrylic acid and 0.034 mole hydrogen ion as p-toluene sulfonic acid. The calculated acrylic acid conversion based on primary OH content was 119.5 percent assuming 2 primary OH's/mole and 2 secondary OH's/mole of the dealkylated bisphenol A-t-BGE adduct.

EXAMPLE 4

Simultaneous Dealkylation and Acrylation of Bisphenol A-t-BGE Adduct

To a stirred three necked glass flask equipped with a flash head connected to a receiver having a reflux condenser, in turn, connected to a vacuum source, were charged: 244 grams (0.5 mole) bisphenol A-t-BGE adduct, 0.23 gram phenothiazine (polymerization inhibitor), 6.1 grams (0.032 mole) p-tSA (dealkylation and esterification catalyst), 215.7 grams (2.90 moles) 97 percent acrylic acid (290 percent of theory on primary OH's). The contents were heated at 80°-95° C. at atmospheric pressure over a 20-minute period, then 95°-99° C. at atmospheric pressure over a 1-hour period and then 99° C. at a pressure of 200 mm Hg for 45 minutes to complete the dealkylation and esterification reactions. The reaction yielded 48 grams as isobutylene, 40 grams distillate containing 0.304 mole hydrogen ion as acrylic acid, and 378 grams crude product containing 1.53 moles hydrogen ion as acrylic acid and 0.032 mole hydrogen ion of a p-toluene sulfonic acid. The calculated acrylic acid conversion based on primary OH content was 106.6 percent assuming 2 primary OH's/mole and 2 secondary OH's/mole of dealkylated bisphenol A-t-BGE adduct.

What is claimed is:

1. A process for preparing vinyl ester resins wherein a hydroxy phenolic compound is reacted in the presence of a basic catalyst with tertiary alkyl glycidyl ether and the resulting reaction product is dealkylated and esterified with an ethylenically unsaturated carboxylic acid.

2. The process claimed in claim 1 wherein said hydroxy phenolic compound is a dihydroxy phenol.

3. The process claimed in claim 2 wherein said dihydroxy phenol is bisphenol A.

4. The process claimed in claim 1 wherein said tertiary alkyl glycidyl ether is tertiary butyl glycidyl ether.

5. The process claimed in claim 1 wherein said resulting reaction product is simultaneously dealkylated and esterified with said carboxylic acid.

6. The process claimed in claim 1 wherein said resulting reaction product is sequentially dealkylated and subsequently esterified with said carboxylic acid.

7. The process claimed in claim 1 wherein the hydroxy phenolic compound and the tertiary alkyl glycidyl ether are in the ratio of stoichiometric equivalency up to about a 10 percent excess of said glycidyl ether.

8. The process claimed in claim 1 wherein said basic catalyst is triphenyl phosphine.

9. The process claimed in claim 1 wherein said unsaturated carboxylic acid is acrylic acid.

10. The process claimed in claim 1 wherein the dealkylation and esterification is induced with a strong acid catalyst.

11. The process claimed in claim 10 wherein said strong acid catalyst is p-toluene sulfonic acid.

* * * * *

UNITED STATES PATENT AND TRADEMARK OFFICE
CERTIFICATE OF CORRECTION

PATENT NO. : 4,296,220

DATED : October 20, 1981

INVENTOR(S) : Harold O. Seeburger; Ralph G. Beattie; Violete L. Stevens

It is certified that error appears in the above-identified patent and that said Letters Patent are hereby corrected as shown below:

Column 1, line 47, please delete "esters" and substitute --ethers-- therefor.

Signed and Sealed this

Twenty-fourth Day of August 1982

[SEAL]

Attest:

GERALD J. MOSSINGHOFF

Attesting Officer     Commissioner of Patents and Trademarks